(12) United States Patent
Entleutner

(10) Patent No.: US 6,663,011 B1
(45) Date of Patent: Dec. 16, 2003

(54) POWER GENERATING HEATING UNIT

(76) Inventor: Mark Entleutner, 9702 - 102nd Ave. North, Maple Grove, MN (US) 55369

( * ) Notice: Subject to any disclaimer, the term of this patent is extended or adjusted under 35 U.S.C. 154(b) by 24 days.

(21) Appl. No.: 10/066,478

(22) Filed: Jan. 31, 2002

Related U.S. Application Data

(60) Provisional application No. 60/265,848, filed on Feb. 1, 2001.

(51) Int. Cl.[7] .................................................. B60H 1/02
(52) U.S. Cl. ........................ 237/12.1; 237/2 A; 60/39.5
(58) Field of Search ................................ 237/12.1, 2 A; 60/39.183, 39.5, 39.15

(56) References Cited

U.S. PATENT DOCUMENTS

| 2,970,434 A | * | 2/1961 | Warren .................... 60/39.182 |
| 4,036,028 A | * | 7/1977 | Mandrin ..................... 62/50.3 |
| 4,418,538 A | * | 12/1983 | Heinrich ..................... 60/646 |
| 4,466,241 A | * | 8/1984 | Inui et al. ................ 60/39.182 |
| 4,706,612 A | * | 11/1987 | Moreno et al. ............. 122/7 R |
| 4,754,607 A | * | 7/1988 | Mackay ....................... 60/723 |
| 5,535,591 A | * | 7/1996 | Priesemuth .................. 60/670 |
| 5,878,675 A | * | 3/1999 | Iijima et al. ............... 110/215 |
| 6,200,128 B1 | * | 3/2001 | Kobayashi ..................... 431/5 |
| 6,318,066 B1 | * | 11/2001 | Skowronski ................. 60/776 |

* cited by examiner

*Primary Examiner*—Derek Boles
(74) *Attorney, Agent, or Firm*—Sherrill Law Offices, PLLC

(57) ABSTRACT

A power generating heating unit including a housing, a turbine for generating mechanical energy and heated exhaust gas, an electrical generator for converting the mechanical energy to electrical energy, and a heat exchanger for transferring heat from the heated exhaust gas to a fluid.

15 Claims, 3 Drawing Sheets

POWER GENERATING HEATING UNIT

This application claims the benefit of U.S. Provisional Application No. 60/265,848, filed Feb. 1, 2001.

FIELD OF THE INVENTION

The invention relates to residential and commercial heating equipment.

BACKGROUND

A wide variety of common household and commercial appliances burn fuels, such as natural gas and propane, to generate heat, including furnaces, space heaters, hot water heaters, pool heaters, clothes dryers, ovens, stoves, etc. Such appliances utilize heat exchangers to extract heat from the combustion process, but do not harness any mechanical power from the combustion process.

Accordingly, a substantial need exists for a heating unit capable of extracting, harnessing and using both the heat and mechanical power generated by the combustion of combustible fuels.

SUMMARY OF THE INVENTION

A first aspect of the invention is a power generating heating unit. The unit includes a housing, a turbine, an electrical generator and a heat exchanger. The turbine is retained within the housing and is in fluid communication an air intake port and a fuel intake port in the housing for converting air and a combustible fuel into mechanical power and a stream of heated exhaust gas. The electrical generator is in powered communication with the turbine for converting the mechanical power generated by the turbine into electrical power. The heat exchanger is in fluid communication with the turbine and with an exhaust gas outlet port, a cold fluid intake port and a heated fluid outlet port in the housing for transferring heat from the heated exhaust gas generated by the turbine to a fluid.

In a specific embodiment, the power generating heating unit may be employed in a hot water heater. The hot water heater constructed with the power generating heating unit includes a housing, a turbine, an electrical generator, a heat exchange tube and a thermostat. The housing defines an equipment chamber and a water tank, and has several ports including (i) an air intake port in fluid communication with the equipment chamber, (ii) an exhaust gas outlet port in fluid communication with the equipment chamber, (iii) a cold water intake port in fluid communication with the water tank, (iv) a hot water outlet port in fluid communication with the water tank, and (v) a fuel intake port in fluid communication with the equipment chamber. The turbine is retained within the equipment chamber and is in fluid communication with the air intake port and the fuel intake port for converting air and a combustible fuel into mechanical power and a stream of heated exhaust gas. The electrical generator is in powered communication with the turbine for converting the mechanical power generated by the turbine into electrical power. The heat exchange tube is retained within the water tank and is in fluid communication with the turbine and the exhaust gas outlet port for transferring heat from the heated exhaust gas generated by the turbine to water retained within the water tank. The hot water heater is controlled by a thermostat which is in thermal communication with water retained within the water tank and in electrical communication with the turbine for periodically sensing the temperature of the water and automatically initiating operation of the turbine when the sensed temperature falls below a predetermined temperature.

A second embodiment of the invention is a method of generating heat and electrical power. The method includes the steps of (1) operating a turbine to generate mechanical power and a stream of heated exhaust gas, (2) converting the mechanical power to electrical power, (3) transmitting the electrical power to an electrical device for use as a power source by the electrical device, (4) transferring heat from the heated exhaust gas to a fluid so as to form a heated fluid, (5) venting the exhaust gas into the atmosphere, and (6) transmitting the heated fluid to a remote location relative to the turbine.

DETAILED DESCRIPTION OF THE INVENTION INCLUDING A BEST MODE

Definitions

As utilized herein, including the claims, the phrase "combustible fuel" means a gaseous or liquid composition capable of explosive ignition when mixed or atomized with air and contacted by an ignition source. Exemplary combustible fuels include specifically, but not exclusively, hydrogen, methane, propane, butane, methanol, ethanol, methyl ethyl ketone, aviation fuel, jet fuel, gasoline, kerosene, diesel fuel, natural gas, etc.

As utilized herein, including the claims, the phrase "electrical device" means a device powered by electricity. Exemplary electrical devices include specifically, but not exclusively, electrical motors, electrical heaters and electrical igniters.

As utilized herein, including the claims, the term "fluid" includes both gaseous and liquid mediums. Exemplary fluids include specifically, but not exclusively, air and water.

As utilized herein, including the claims, the phrase "remote location" means a site more than ten (10) linear feet away.

Nomenclature

Figure 1:
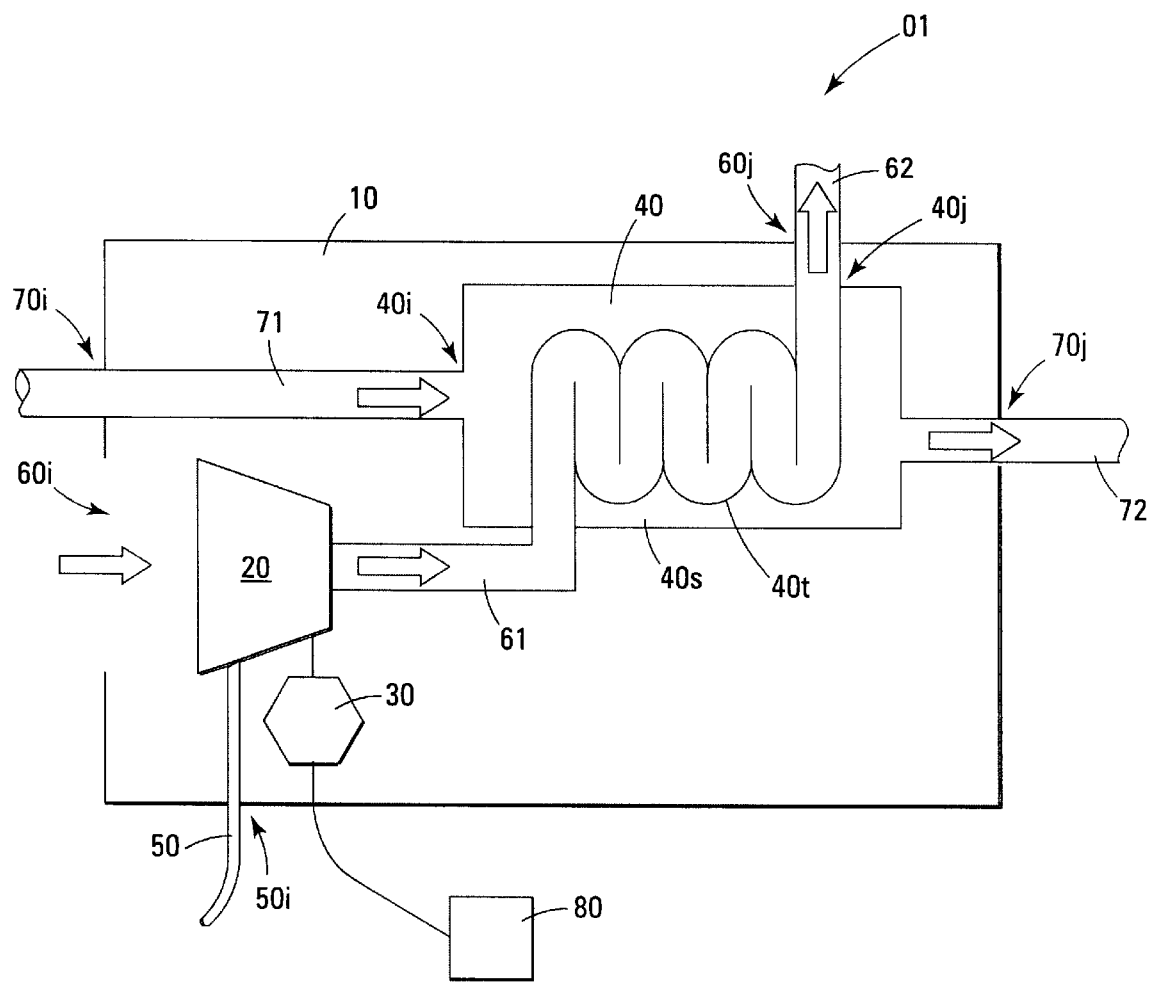
FIG. 1 is a schematic view of an embodiment of the invention.

01 Heating Unit
10 Housing
20 Turbine
30 Electrical Generator
40 Heat Exchanger
40i Cold Fluid Intake Port in Shell
40j Hot Fluid Outlet Port in Shell
40s Shell of Heat Exchanger
40t Tube of Heat Exchanger
50 Fuel Line
50i Fuel Intake Port
60i Air Intake Port
60j Exhaust Gas Outlet Port
61 Exhaust Gas Conduit Between the Turbine and the Heat Exchanger
62 Flue
70i Cold Fluid Intake Port
70j Hot Fluid Outlet Port 71 Cold Fluid Conduit
72 Hot Fluid Conduit
80 Electrical Device
100 Hot Water Heater
100b Equipment Chamber
100w Water Tank
110 Housing
120 Turbine
130 Electrical Generator
140 Heat Exchanger
150 Fuel Line
150i Fuel Intake Port
160i Air Intake Port
160j Exhaust Gas Outlet Port
161 Exhaust Gas Conduit Between the Turbine and the Heat Exchanger
162 Flue
170i Cold Water Intake Port
170j Hot Water Outlet Port
171 Cold Water Line
172 Hot Water Line
190 Thermostat
200 Water
300 Structure Construction As shown in FIG. 1, a first aspect of the invention is a power generating heating unit 01. The unit 01 includes a housing 10, a turbine 20, an electrical generator 30 and a heat exchanger 40.

The unit 01 can be sized to provide heat and electrical power in a wide variety of settings from residential dwellings to apartment complexes, office buildings, commercial and industrial buildings, warehouses, sporting complexes, etc. The unit 01 is particularly suited for use in residential dwellings and commercial buildings having less than 20,000 square feet of floor space.

The housing 10 encloses the various components of the unit 10 and includes appropriate intake and outlet ports. The housing 10 is preferably constructed of metal, such as steel or aluminum, capable of withstanding the high temperatures achieved during operation of the unit 01.

The turbine 20 is mounted within the housing 10 and is in fluid communication with air via an air intake port 60i in the housing 10 and in fluid communication with a source of a combustible fuel via a fuel line 50 passing through a fuel intake port 50i in the housing 10. The turbine 20 is effective for converting air and a combustible fuel into mechanical power and a stream of heated exhaust gas.

The electrical generator 30 is in powered communication with the turbine 20, through an appropriate linkage (not shown) with the rotating shaft (not shown) of the turbine 20, for converting the mechanical power generated by the turbine 20 into electrical power. Communication between the turbine 20 and the electrical generator 30 may be effected by a direct mechanical linkage, a hydraulic system or magnetically. Suitable electrical generators 30 include standard automobile alternators.

Due to the high rpm of the shaft (not shown), typically between about 20,000 to about 175,000 rpm, the linkage (not shown) between the shaft (not shown) and the electrical generator 30 will likely require a sizable reduction in rpm as typical electrical generators 30 operate at an rpm of about 5,000 to about 20,000. A suitable reducer (not shown) capable of achieving the desired reduction in rpm is a planetary gear reducer available on special order from the Zenith products Division of Parker Hannifin Corporation. It is preferred to have the planetary gear reducer customized with ceramic bearings due to the high rpms to which the reducer may be subjected.

The electrical generator 30 is electrically connected to an electrical device 80 capable of utilizing or storing the electrical power generated by the electrical generator 30. Since electrical power will be generated by the electrical generator 30 on a periodic and erratic basis (i.e., when heated fluid is required), preferred electrical devices 80 are those which (i) do not require constant electrical power or electrical power on demand (e.g., an auxiliary electrical heating unit (not shown) for maintaining a storage space (not shown) above freezing), or (ii) requires power in conjunction with each requirement for heated fluid (e.g., the fan (not shown) of a forced air furnace (not shown) employing the unit 01, or an electrical heating unit (not shown) within the water tank 100w of a hot water heater 100 employing the unit 01). Alternatively, the electrical power generated by the electrical generator 30 may be stored in an electric storage cell or rechargeable battery (not shown) or sold to a power company and contributed to the power distribution system (not shown).

The heat exchanger 40 is employed to transfer heat from the exhaust gas emitted by the turbine 20 to a fluid, such as air for heating a building, or water for providing hot water throughout a building. The heat exchanger 40 includes a tube 40t and a shell 40s. As shown in FIG. 1, a first end (unnumbered) of the tube 40t is in fluid communication with the exhaust gas emitted by the turbine 20 through a conduit 61. A second end (unnumbered) of the tube 40t extends through an exhaust gas outlet port 60j in the housing 10 and is vented to the atmosphere by a flue 62. The shell 40s has an intake port 40i which is in fluid communication with a source of a cold fluid via a cold fluid conduit 71 which connects the intake port 40i in the shell 40s with the cold fluid intake port 70i in the housing 10. The shell 40s also has an outlet port 40j for removing fluid heated within the heat exchanger 40 and conveying the heated fluid outside the unit 01 via a hot fluid conduit 72 extending through a hot fluid outlet port 70j in the housing 10. Of course, the connections of the tube 40t and the shell 40s to the exhaust gas and the fluid may be switched as desired to facilitate construction, reduce costs and/or optimize heat transfer from the exhaust gas to the fluid.

While the power generating heating unit 01 may be constructed to substantially any size, the unit 01 is preferably constructed to generating between 1,000 and 1,000,000 BTU/hr, preferably between 1,000 and 500,000 BTU/hr so that the unit 01 can be quickly and easily installed and employed in residential dwellings and smaller commercial settings where traditional mass marketed forced air furnaces and hot water heaters are employed. More specifically, the power generating heating unit 01 is preferably constructed to transfer between 1,000 and 1,000,000 BTU/hr to a fluid, preferably between 1,000 and 500,000 BTU/hr.

In a first specific embodiment, the power generating heating unit 01 may be employed in a forced air furnace (not shown) wherein (i) the fluid is air, (ii) the fluid intake port 70i in the housing 10 is in fluid communication with the cold air return duct system (not shown) of the forced air heating system, and (iii) the fluid outlet port 70j is in fluid communication with the heating duct system (not shown) of the forced air heating system. Generally, when the power generating heating unit 01 is employed in a forced air furnace the turbine 20 will utilize natural gas or propane as the combustible fuel as these fuels are readily available for such use.

Figure 2:
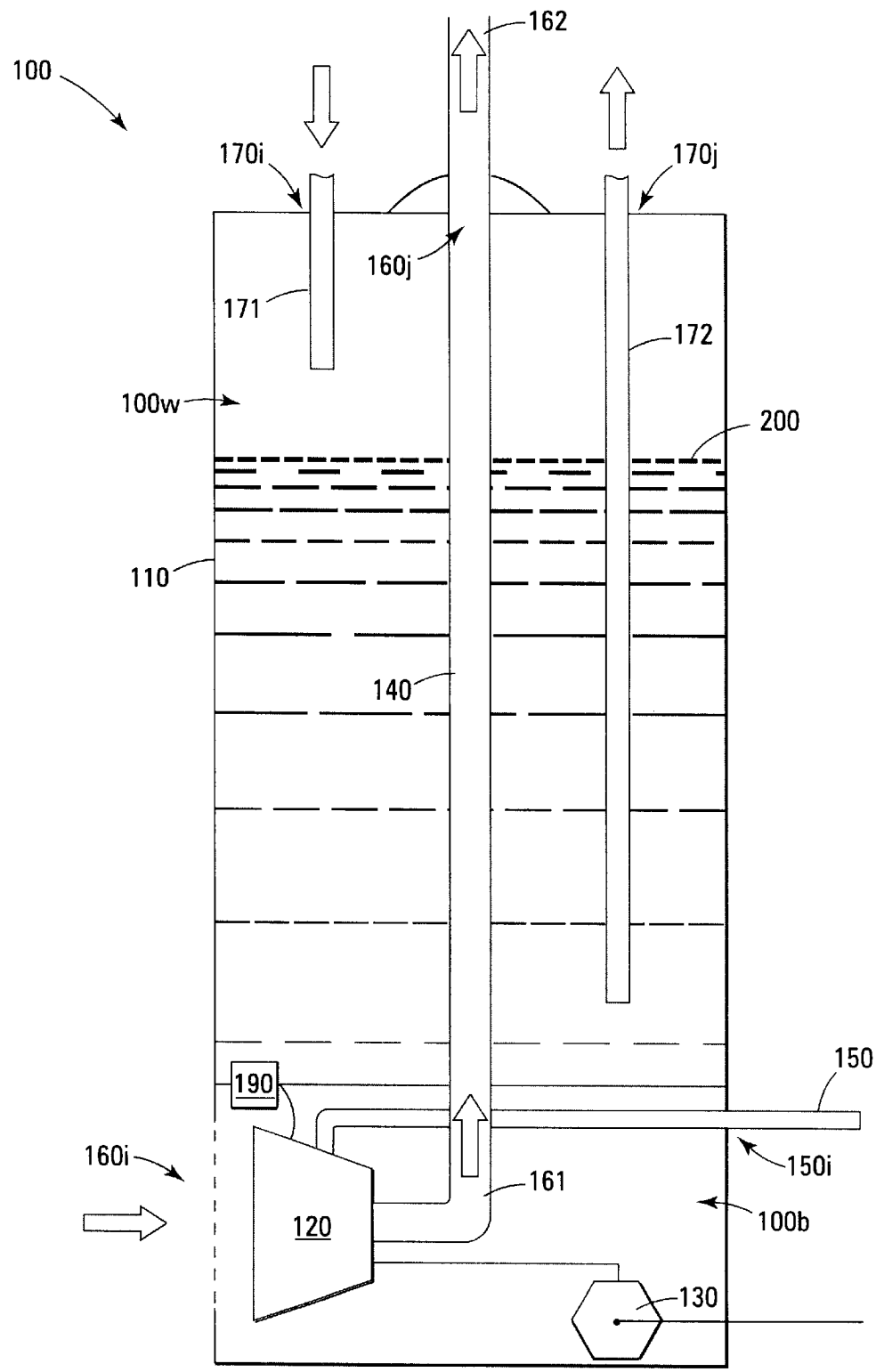
FIG. 2 is a schematic view of a hot water heater embodying the invention.
Figure 3:
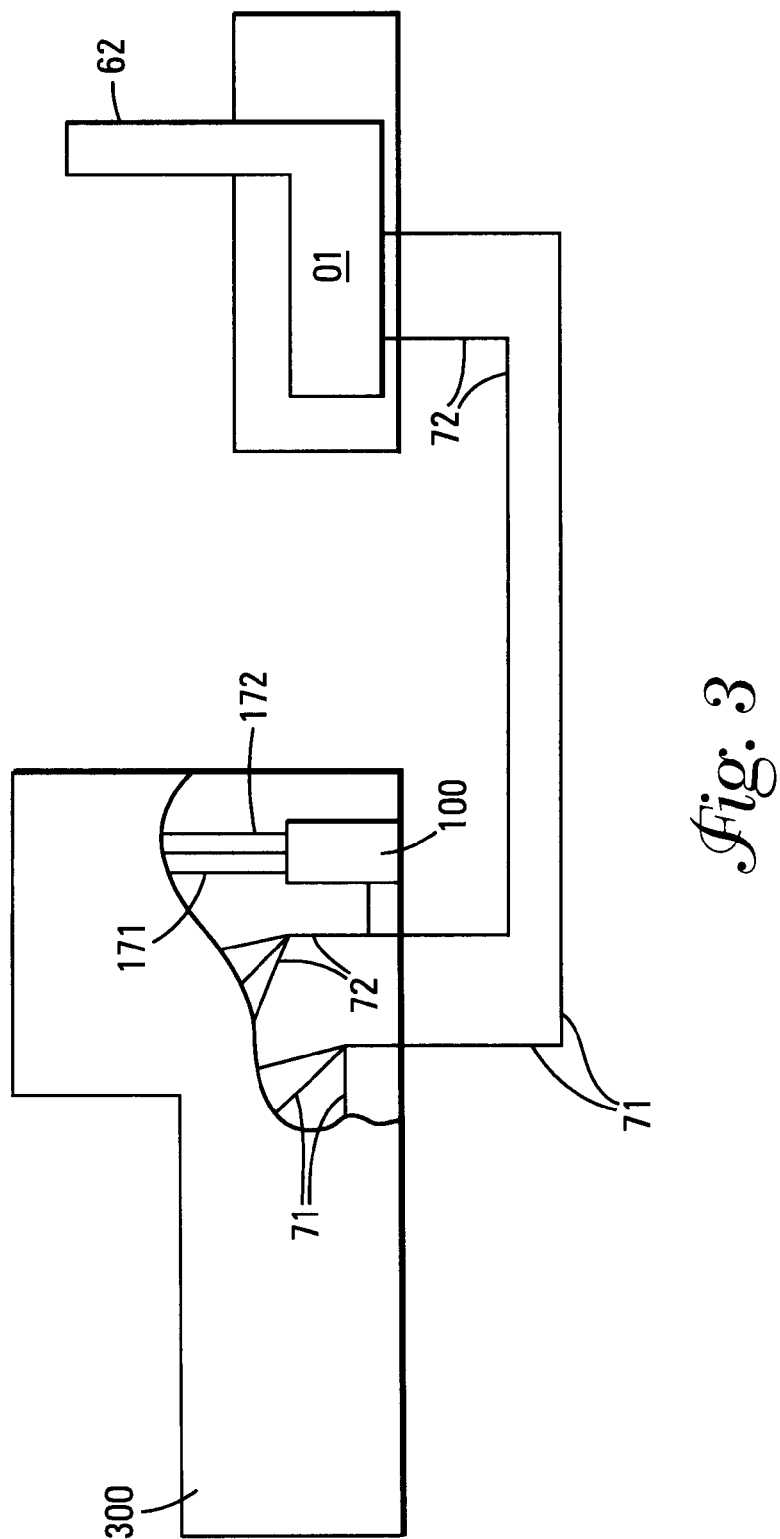
FIG. 3 is a schematic view of one embodiment of the invention in fluid communication with a structure.

In a second specific embodiment, the power generating heating unit 01 may be employed in a hot water heater 100. As shown in FIG. 2, a hot water heater 100 constructed with the power generating heating unit 01 includes a housing 110, a turbine 120, an electrical generator 130, a heat exchanger 140 and a thermostat 190.

The hot water heater 100 includes an equipment chamber 100b and a water tank 100w. The housing 110 encloses the various components of the hot water heater 100 and includes appropriate intake and outlet ports. These ports including (i) an air intake port 160i in fluid communication with the equipment chamber 100b for providing the turbine 120 with a source of air, (ii) an exhaust gas outlet port 160j in fluid communication with the equipment chamber 100b for venting exhaust gases to the atmosphere, (iii) a cold water intake port 170i in fluid communication with the water tank 100w for providing cold water to the water tank 100w, (iv) a hot water outlet port 170j in fluid communication with the water tank 100w for allowing the withdrawal and distribution of hot water, and (v) a fuel intake port 150i in fluid communication with the equipment chamber 100b for providing the turbine 120 with a source of combustible fuel.

The turbine 120 is retained within the equipment chamber 100b and is in fluid communication with the air intake port 160i and the fuel intake port 150i for converting air and a combustible fuel into mechanical power and a stream of heated exhaust gas.

The electrical generator 130 is also retained within the equipment chamber 100b and is in powered communication with the turbine 120 for converting the mechanical power generated by the turbine 120 into electrical power.

The heat exchanger 140 is a heat exchange tube which extends through the water tank 100w and is in fluid communication with the turbine 120 and the exhaust gas outlet port 160j for transferring heat from the heated exhaust gas generated by the turbine 120 to water 200 retained within the water tank 100w.

Operation of the hot water heater 100 is controlled by a thermostat 190 which is in thermal communication with the water 200 retained within the water tank 100w and in electrical communication with the turbine 120 for periodically sensing the temperature of the water 200 and automatically initiating operation of the turbine 120 when the sensed temperature falls below a predetermined temperature.

Use

A second aspect of the invention is a method of generating heat and electrical power. The method includes the steps of (1) operating a turbine 20 to generate mechanical power and a stream of heated exhaust gas, (2) converting the mechanical power to electrical power, (3) transmitting the electrical power to an electrical device 80 for use as a power source by the electrical device 80, (4) transferring heat from the heated exhaust gas to a fluid so as to form a heated fluid, (5) venting the exhaust gas into the atmosphere, and (6) transmitting the heated fluid to a remote location relative to the turbine 20.

What is claimed is:

1. A power generating heating unit, comprising
    (a) a housing having at least
        (1) an air intake port,
        (2) an exhaust gas outlet port,
        (3) a cold fluid intake port,
        (4) a heated fluid outlet port in fluid communication with an interior space of a structure, and
        (5) a fuel intake port,
    (b) a turbine retained within the housing and in fluid communication with the air intake port and the fuel intake port for converting air and a combustible fuel into mechanical power and a stream of heated exhaust gas,
    (c) an electrical generator in powered communication with the turbine for converting the mechanical power generated by the turbine into electrical power, and
    (d) a heat exchanger in fluid communication with the turbine, the exhaust gas outlet port, the cold fluid intake port and the heated fluid outlet port for transferring heat from the heated exhaust gas generated by the turbine to a fluid,
    (e) a thermostat in thermal communication with the interior space of the structure and in electrical communication with the turbine for periodically sensing the temperature of a fluid within the interior space of the structure and automatically requesting operation of the turbine when the sensed temperature falls below a predetermined temperature.

2. The power generating heating unit of claim 1 wherein the unit is installed within a building and the exhaust gas outlet port is in fluid communication with a flue vented outside the building.

3. The power generating heating unit of claim 2 wherein the building is a residential dwelling or commercial building having less than 20,000 square feet of floor space.

4. The power generating heating unit of claim 2 wherein the cold fluid intake port is in fluid communication with a cold air return duct system of a forced air heating system in the building.

5. The power generating heating unit of claim 2 wherein the heated fluid outlet port is in fluid communication with a heating duct system of a forced air heating system in the building.

6. The power generating heating unit of claim 5 wherein the building is a residential dwelling.

7. The power generating heating unit of claim 1 wherein the fuel intake port is in fluid communication with a source of natural gas.

8. The power generating heating unit of claim 1 wherein the fuel intake port is in fluid communication with a source of propane.

9. The power generating heating unit of claim 1 wherein the electrical generator is electrically connected to an electric storage cell.

10. The power generating heating unit of claim 1 wherein the cold fluid intake port and the hot fluid outlet port are in fluid communication with water retained within a swimming pool.

11. The power generating heating unit of claim 1 wherein the unit is capable of generating between 1,000 and 1,000,000 BTU/hr.

12. The power generating heating unit of claim 1 wherein the unit is capable of generating between 1,000 and 500,000 BTU/hr.

13. The power generating heating unit of claim 1 wherein the unit is capable of transferring between 1,000 and 1,000,000 BTU/hr from the heated exhaust gas generated by the turbine to a fluid.

14. The power generating heating unit of claim 1 wherein the unit is capable of transferring between 1,000 and 500,000 BTU/hr from the heated exhaust gas generated by the turbine to a fluid.

15. A hot water heater, comprising:
(a) a housing defining an equipment chamber and a water tank, and having at least:
    (1) an air intake port in fluid communication with the equipment chamber,
    (2) an exhaust gas outlet port in fluid communication with the equipment chamber,
    (3) a cold water intake port in fluid communication with the water tank,
    (4) a hot water outlet port in fluid communication with the water tank, and
    (5) a fuel intake port in fluid communication with the equipment chamber,
(b) a turbine retained within the equipment chamber and in fluid communication with the air intake port and the fuel intake port for converting air and a combustible fuel into mechanical power and a stream of heated exhaust gas,
(c) an electrical generator in powered communication with the turbine for converting the mechanical power generated by the turbine into electrical power,
(d) a heat exchange tube retained within the water tank and in fluid communication with the turbine and the exhaust gas outlet port for transferring heat from the heated exhaust gas generated by the turbine to water retained within the water tank, and
(e) a thermostat in thermal communication with water retained within the water tank and in electrical communication with the turbine for periodically sensing the temperature of water retained within the water tank and automatically requesting operation of the turbine when the sensed temperature falls below a predetermined temperature.

* * * * *